UNITED STATES PATENT OFFICE.

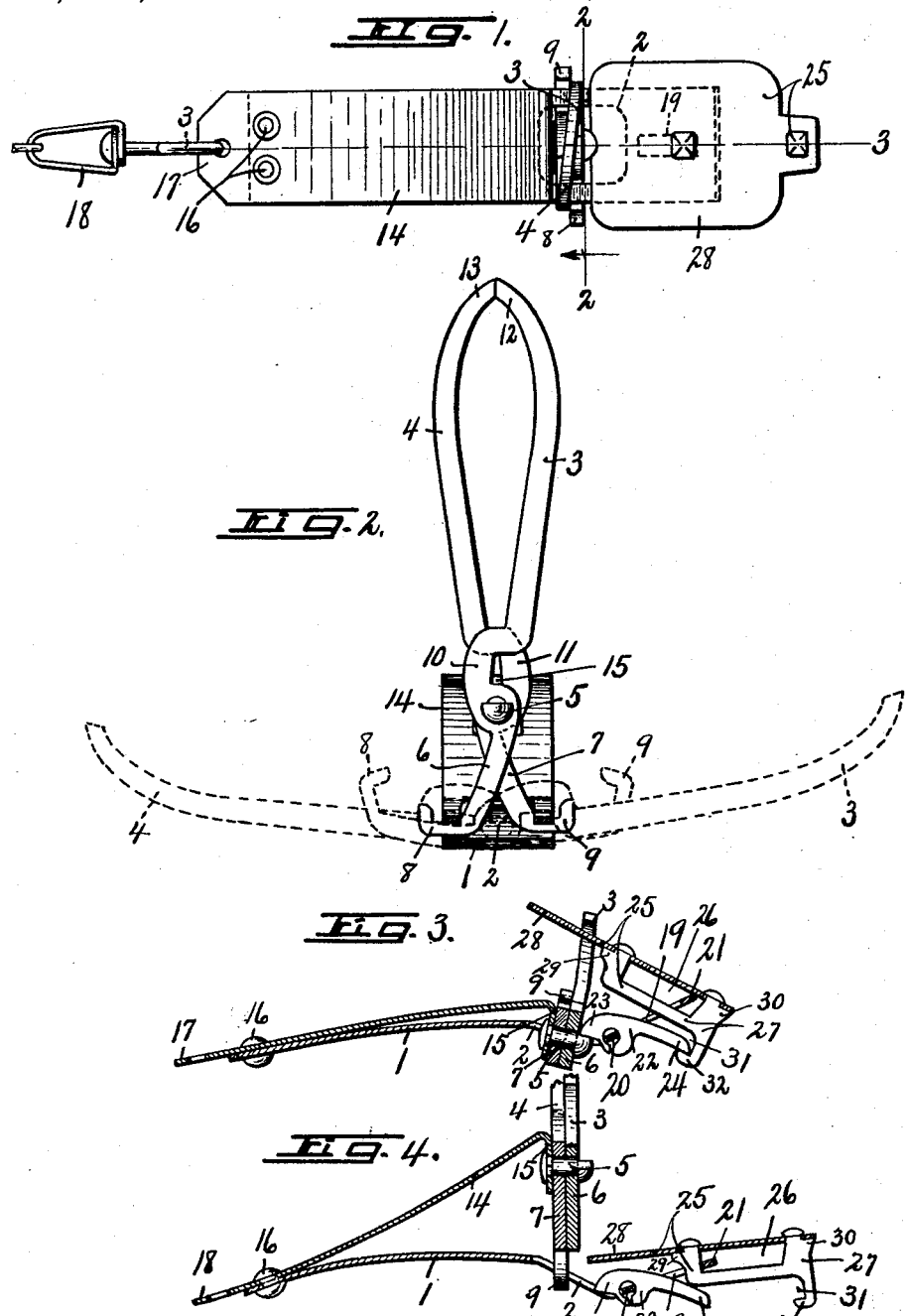

ROLLIN SMITH HURLBUT, OF ONEIDA, NEW YORK, ASSIGNOR TO ONEIDA COMMUNITY, LIMITED, OF ONEIDA, NEW YORK, A CORPORATION OF NEW YORK.

TRAP.

1,220,143.     Specification of Letters Patent.     Patented Mar. 20, 1917.

Application filed May 15, 1916. Serial No. 97,633.

*To all whom it may concern:*

Be it known that I, ROLLIN SMITH HURLBUT, a citizen of the United States of America, and resident of Oneida, in the county of Madison, in the State of New York, have invented new and useful Improvements in Traps, of which the following, taken in connection with the accompanying drawings, is a full, clear, and exact description.

This invention relates to traps, and particularly to animal traps involving the use of spring actuated jaws.

The primary object of the invention is to produce a new and improved trap of great efficiency, simple construction, and which may be easily set and is delicately susceptible to a releasing pressure tending to spring the same.

The specific structure disclosed for accomplishing the primary object of this invention involves the production of various new and improved constructions and arrangements of parts, more particularly and in detail set forth in the claims hereto appended.

Other objects and advantages will appear from the following description, taken in connection with the accompanying drawings, in which—

Figure 1 is a top plan view of the trap.

Fig. 2 is a cross section on line 2—2, Fig. 1.

Fig. 3 is a section on line 3—3, Fig. 1, showing the trap "set."

Fig. 4 is a cross section similar to Fig. 3 showing the trap "sprung."

The new and improved trap of this invention comprises a base —1— preferably formed of an elongated strip of sheet metal and may, as shown, be somewhat bowed to constitute a spring base adapted to assist in closing the jaws.

The base —1— is provided intermediate its ends with an aperture —2— indicated in dotted lines Fig. 1, and the jaws —3— and —4— pivotally connected at their crossing portions by a rivet or bolt —5— are provided with rearwardly projecting downwardly diverging portions —6— and —7—, respectively, slidably positioned in the aperture —2— and provided with hook shaped end parts —8— and —9— adapted to engage the base —1— to limit the upward movement of the jaws and normally prevent their separation from the base.

The jaws —3— and —4— may be of any desired shape and form, and in the specific illustration are provided with U-shaped portions —10— and —11— adjacent their pivotal point so that the jaw portions actually cross each other at some distance from their pivotal points on the bolt —5— and may be slightly curved toward their end portions —12— and —13—, which are adapted to contact with each other to limit the closing movement of the jaws.

For the purpose of normally holding the jaws in closed position, and for exerting upon them in any other position a resilient pressure tending to close them, a spring or elongated bar —14— of sheet metal has one end provided with a flange —15— mounted upon or secured to the rivet —5— constituting the pivot of the jaws —3— and —4— and its intermediate portion secured flat face down upon the base —1— in any suitable manner, as by rivets —16—, and its other end portion —17— projecting beyond the base constitutes an attaching means for a chain —18— or other trap securing device.

The elongated bar —14— may, as shown, be bowed somewhat toward the base to resiliently resist the downward movement of the jaws essential to the spreading of the jaws. It is apparent that other suitable connections may be made between the spring —14— and the jaws for accomplishing the same purpose.

The base —1— projects some distance beyond the aperture —2— and is provided with an elongated slot —19— indicated in dotted lines Fig. 1, forming a pair of integral pintles —20— and —21—. A detent —22— is pivotally mounted upon the pintle —20— and is provided with oppositely extending lugs —23— and —24—.

The bait pan —25— is provided with an elongated slot —26— in which the pintle —21— is slidable, thereby allowing the bait pan to move longitudinally of the base —1— a distance substantially equal to the length of the slot —26— for a purpose hereinafter described, and preferably the slot —26— is formed by attaching the free ends of a U-shaped member —27— to a platform —28— and, as shown, these ends may extend through openings in the platform —28— and may be riveted into contact with the upper face of said platform or may be otherwise secured, as desired, the U-shaped member being provided with flanges —29— and —30— limiting the extent to which said free end portions may pass through the openings in the platform —28—.

The bait pan is provided at its shank with a recess —31— forming a finger —32— for a purpose hereinafter described. The setting of the trap may be accomplished in various ways, as for instance the jaws —3— and —4— may be spread apart, thereby causing a similar spreading of the projecting rear portions —6— and —7— causing a relative sliding movement of the base and said rear portions —6— and —7—, tending to move the pivotal point of the jaws —3— and —4— toward the base —1— against the action of the spring —14— tending to hold the jaws at their limit of upward movement relatively to the base.

When the jaws are spread, as shown in dotted lines, Fig. 2, the pivotal point of the jaws, in this instance determined by the bolt —5—, has moved to a position in line with or adjacent the plane of the base —1— and the end of the bolt —5— is in position to be engaged by the lug —23— of detent —22—, and the opposite lug —24— is then adapted to engage the finger —32— upon the bait pan —25— when said pan is slid forwardly toward the jaws —3— and —4— to the point where its further movement is prevented by contact of the pintle —21— with the rear wall of the slot —26—. In this position of the bait pan, the platform —28— extends between the jaws —3— and —4— and the pressure exerted downwardly by lug —24— upon finger —32— is greater than the pressure tending to slide the pan rearwardly along the pintle —21—.

A slight pressure, however, upon the platform —28— is sufficient to slide or tilt the bait pan about the pintle —21— sufficient to release the lug —24— from engagement with the finger —32—, whereupon the engagement of bolt —5— and lug —24— is released permitting the spring —16—, and in this specific construction with the assistance of base —1—, to move the jaws —3— and —4— and portions —6— and —7— upwardly, whereby the downwardly diverging form of said portions —6— and —7— moving in the aperture —2— cause the jaws to close, and preferably the head of bolt —5— is radially flattened for engagement with the lug —23—. It will be apparent, however, that any other suitable means may be provided for engagement with the lug —23— whereby the upward movement of the jaws may be prevented when the lug —24— is engaged with finger —32—.

It will be obvious that the construction shown involves the use of a pair of, in this instance oppositely bowed, springs diverging toward their points of connection to the jaws; that the bait pan and detent are mounted upon an extension of the base or lower spring, and that both the jaws and the bait pan are slidable with respect to said base or lower spring; that in "set" position of the trap the bait pan has a portion positioned in the path of the closing jaws and that said bait pan is automatically thrown from said path upon release of the jaws, permitting unobstructed operation of the jaws.

Although I have shown and described one particular construction, form, arrangement, and method of operation of the parts, I do not desire to limit myself to the same, as many changes may be made in each or all of the same without departing from the spirit of this invention as set forth in the appended claims.

What I claim is:

1. In a trap a base, a pair of crossed jaws pivotally connected and having portions rearwardly of the pivot engaged with the base and a spring secured to the base and to the jaws.

2. In a trap a pair of jaws operating in a plane substantially perpendicular to the base, said jaws having registering openings, a spring secured to the base and having a flanged end provided with an opening registering with the openings through the jaws and a pivot pin extending through said registering openings through the spring and the jaws.

3. In a trap a pair of jaws operating in a plane substantially perpendicular to the base, said jaws having registering openings, a spring secured to the base and having a flanged end provided with an opening registering with the openings through the jaws, a pivot pin extending through said registering openings through the spring and the jaws, and portions of the jaws projecting rearwardly from the pivot and slidably engaged with the base.

4. In a trap a pair of oppositely bowed springs rigidly secured together at one end, one of said springs provided with an opening, a pair of jaws pivotally mounted upon the free end of the other spring and having a portion projecting rearwardly from the pivot and slidably positioned in the opening in the other spring.

5. In a trap, a base having an aperture, a pair of pivotally connected jaws having portions projecting rearwardly from the pivot and slidable in said aperture, means for limiting the movement of said portions relatively to the base, and means tending to hold said portions at a limit of movement relative to the base.

6. In a trap, a base having an aperture, a pair of pivotally connected jaws having portions projecting rearwardly from the pivot and slidable in said aperture, means for limiting the movement of said portions relatively to the base, and a spring engaged with the pivot of the jaws and with the base.

7. In a trap, a base having an aperture, a spring connected to the base, a pair of jaws pivotally mounted upon one end of the spring, said jaws having rearwardly projecting portions diverging toward the base and slidable in said aperture, means for limiting the movement of said portions relatively to the base, and means for holding the jaws in set position.

8. In a trap, a pair of oppositely bowed springs, a pair of jaws pivotally mounted upon the end of one of said springs and having portions extending rearwardly from the pivot slidably engaged with the other spring, and means for holding the jaws in set position against the action of said springs.

9. In a trap, a base, a spring secured to one end of the base, a pair of jaws, a bolt pivotally connecting one end of the spring and said jaws, a bait pan mounted on said base, a detent mounted on said base for engagement with the bait pan and with said bolt.

10. In a trap, a base, a spring secured to one end of the base, a pair of jaws, a bolt pivotally connecting one end of the spring and said jaws, said bolt having a radially flattened head, a bait pan mounted on said base, a detent mounted on said base for engagement with the bait pan and with the flattened head of said bolt.

11. In a trap, a base, having an opening therethrough, a pair of pivoted jaws slidable as an entirety relatively to the base and having portions extending rearwardly from the pivot positioned in said opening and engaging the base to limit the relative movement of the base and jaws, a spring secured to the base and acting on the jaws, said jaws adapted to be used as levers to set the trap.

12. In a trap, a base, having an opening therethrough, a pair of jaws extending at substantially right angles to the base and having portions slidable in said opening and provided with flanges adapted to engage the base and a spring secured to the base and to the jaws for normally holding said flanges in engagement with the base.

13. In a trap, a base, having an opening therethrough intermediate its length, a pair of pivotally connected jaws having portions extending rearwardly from the pivot and movable through said opening, a spring secured to the jaws and to the base at one side of the jaws and a detent and a trigger mounted upon base at the opposite side of the jaws.

14. In a trap, a base, having an opening intermediate its length, a pair of pivotally connected jaws having portions slidable in said opening, a spring secured to the pivot of the jaws and the base at one side of the jaws, a trigger slidably mounted upon the base at the opposite side of the jaws and a detent in engagement with the trigger to hold the jaws in set position.

15. In a trap, a base, a pair of jaws having portions engaged with the intermediate part of the base, a spring connected to the jaws and to the base at one side of the jaws, a trigger mounted upon the base at the opposite side of the jaws and a detent for engagement with the trigger.

16. In a trap, a base, a pair of jaws extending at an angle to the base and having a common pivotal axis, said jaws having portions engaged with the intermediate part of the base, a spring connected to the pivot of the jaws and to the base at one side of the jaws, a trigger mounted upon the base at the opposite side of the jaws and a detent pivotally mounted adjacent the trigger and adapted to engage the trigger and the pivot of the jaws.

In witness whereof I have hereunto set my hand this 2nd day of May, 1916.

ROLLIN SMITH HURLBUT.

Witnesses:
 EUGENE F. KITENDAUGH,
 E. M. SANTRY.

Copies of this patent may be obtained for five cents each, by addressing the "Commissioner of Patents, Washington, D. C."